(12) United States Patent
Licata (10) Patent No.: US 10,104,394 B2
(45) Date of Patent: Oct. 16, 2018

(54) DETECTION OF MOTION ACTIVITY SALIENCY IN A VIDEO SEQUENCE

(71) Applicant: HERE Global B.V., Veldhoven (NL)

(72) Inventor: Aaron Licata, San Ramon, CA (US)

(73) Assignee: HERE Global B.V., Eindhoven (NL)

(*) Notice: Subject to any disclaimer, the term of this patent is extended or adjusted under 35 U.S.C. 154(b) by 568 days.

(21) Appl. No.: 14/169,703

(22) Filed: Jan. 31, 2014

(65) Prior Publication Data

US 2015/0222919 A1    Aug. 6, 2015

(51) Int. Cl.

| | |
|---|---|
| H04N 19/139 | (2014.01) |
| H04N 19/513 | (2014.01) |
| G08B 13/196 | (2006.01) |
| H04N 5/232 | (2006.01) |
| H04N 5/14 | (2006.01) |

(52) U.S. Cl.
CPC ....... *H04N 19/521* (2014.11); *G08B 13/1961* (2013.01); *G08B 13/19602* (2013.01); *G08B 13/19604* (2013.01); *H04N 5/144* (2013.01); *H04N 5/23254* (2013.01); *H04N 19/139* (2014.11); *H04N 19/513* (2014.11)

(58) Field of Classification Search
CPC .......... G08B 13/19602; G08B 13/1961; G08B 13/19604; H04N 5/144; H04N 5/23254; H04N 19/139
See application file for complete search history.

(56) References Cited

U.S. PATENT DOCUMENTS

| | | | | |
|---|---|---|---|---|
| 6,081,606 | A | * | 6/2000 | Hansen ............. G06K 9/00771 348/699 |
| 6,157,677 | A | * | 12/2000 | Martens .................... G06T 7/20 348/416.1 |
| 6,721,454 | B1 | | 4/2004 | Qian et al. |
| 7,408,986 | B2 | | 8/2008 | Winder |
| 7,889,794 | B2 | | 2/2011 | Luo et al. |
| 8,004,563 | B2 | | 8/2011 | Talmon et al. |
| 2003/0164845 | A1 | | 9/2003 | Fayan et al. |

(Continued)

OTHER PUBLICATIONS

Ahmed et al., Detection of Abnormal Motions in Video, 2008, International Workshop on Multimodal Interactions Analysis of Users in a Controlled Environment.

(Continued)

*Primary Examiner* — Robert J Hance
(74) *Attorney, Agent, or Firm* — Lempia Summerfield Katz LLC (57) ABSTRACT

A streaming video or a stored video is analyzed to identify salient features. The salient features are the more interesting portions of the video because salient features include the most motion. A motion vector field including a motion vector for multiple pixels in the video is generated. The motion vector field is partitioned into grid blocks, and each of the grid blocks is divided into a set of orientation ranges. The vectors of the motion vector field for each grid block are binned into the orientation ranges. A motion score is calculated based on a count of motion vectors for the orientation ranges. The section of the video having higher or the highest motion score is designated as a salient feature. Among other applications, salient features may be used for thumbnail images, highlight reels, or video editing.

17 Claims, 9 Drawing Sheets

(56) References Cited

U.S. PATENT DOCUMENTS

| | | | |
|---|---|---|---|
| 2004/0042552 A1* | 3/2004 | Dvorkovich | H04N 5/145 375/240.16 |
| 2004/0109503 A1* | 6/2004 | Lee | H04N 5/145 375/240.16 |
| 2004/0252230 A1 | 12/2004 | Winder | |
| 2005/0185158 A1* | 8/2005 | Matsuhira | H04N 1/00 355/40 |
| 2006/0017843 A1 | 1/2006 | Shi et al. | |
| 2006/0045185 A1* | 3/2006 | Kiryati | G08B 13/19602 375/240.16 |
| 2007/0268965 A1 | 11/2007 | Alfonso et al. | |
| 2008/0025390 A1 | 1/2008 | Shi et al. | |
| 2008/0138029 A1 | 6/2008 | Xu et al. | |
| 2008/0310734 A1* | 12/2008 | Ahammad | G06F 17/30781 382/209 |
| 2009/0033745 A1* | 2/2009 | Yeredor | G01S 3/7864 348/152 |
| 2010/0150403 A1 | 6/2010 | Cavallaro et al. | |
| 2010/0218091 A1* | 8/2010 | Lee | G11B 27/28 715/255 |
| 2011/0097059 A1 | 4/2011 | Sekiguchi et al. | |
| 2011/0205359 A1* | 8/2011 | Lee | G08B 13/19608 348/143 |
| 2012/0210228 A1 | 8/2012 | Wang et al. | |
| 2013/0113934 A1* | 5/2013 | Hotta | G06K 9/00778 348/143 |
| 2013/0148940 A1 | 6/2013 | Schmit et al. | |
| 2013/0182107 A1 | 7/2013 | Anderson | |
| 2014/0063221 A1 | 3/2014 | Mohanakrishnan et al. | |
| 2014/0153902 A1* | 6/2014 | Pearson | G06F 17/30 386/241 |
| 2014/0294320 A1 | 10/2014 | Kokaram et al. | |
| 2014/0359447 A1 | 12/2014 | Kannan et al. | |
| 2015/0050006 A1* | 2/2015 | Sipe | G06K 9/00711 386/241 |
| 2015/0146037 A1* | 5/2015 | Keelan | H04N 9/045 348/223.1 |
| 2015/0235379 A1* | 8/2015 | O'Gorman | G06T 7/2033 382/103 |

OTHER PUBLICATIONS

Junejo et al., View-Independent Action Recognition from Temporal Self-Similarities, 2011, IEEE Transactions on Pattern Analysis and Machine Intelligence.
Shake 4 New Features, 2005, Apple Computer, Inc.
Slow Motion, 2014, http://slow-motion.software.informer.com/.

* cited by examiner

| BIN | TIME RANGE 1 | TIME RANGE 2 | DELTA |
|---|---|---|---|
| A | 1 | 3 | 2 |
| B | 4 | 3 | 1 |
| C | 2 | 5 | 3 |
| D | 4 | 1 | 3 |
| E | 1 | 1 | 0 |
| F | 0 | 1 | 1 |
| G | 0 | 0 | 0 |
| H | 0 | 0 | 0 |
| | | MOTION SCORE | 10 |

DETECTION OF MOTION ACTIVITY SALIENCY IN A VIDEO SEQUENCE

FIELD

The following disclosure relates to the detection of motion activity climax or motion activity saliency, or more particularly, analysis of a video sequence for the detection of motion activity climax or motion activity saliency.

BACKGROUND

Video hosting and sharing software or websites provide video on demand to users. The video content may also be provided by users of the websites. In some examples, the video content may be described by title or by a summary of the content. In other examples, a thumbnail may be displayed for each video. The thumbnail is an image to represent the content of the video. The thumbnail may be manually selected from the video. However, selection of the thumbnail is cumbersome and time consuming.

Security cameras collect surveillance videos of homes, business, or other areas. Often the security cameras run non-stop, operating 24 hours per day and seven days per week. When an incident occurs such as an intruder, an accident, or a crime, the surveillance video is retrieved and reviewed. However, in some instances many hours of video must be reviewed before the section of video including the incident can be located. The process of reviewing video is cumbersome and time consuming.

SUMMARY

In one embodiment, a streaming video or a stored video is analyzed to identify salient features. The salient features are the more interesting portions of the video because salient features include the most motion. A motion vector field including a motion vector for multiple pixels in the video is generated. The motion vector field is partitioned into grid blocks, and each of the grid blocks is divided into a set of orientation ranges. The vectors of the motion vector field for each grid block are binned into the orientation ranges. A motion score is calculated based on a count of motion vectors for the orientation ranges. The section of the video having higher or the highest motion score is designated as a salient feature. Among other applications, salient features may be used for thumbnail images, highlight reels, or video editing.

BRIEF DESCRIPTION OF THE DRAWINGS

Exemplary embodiments of the present invention are described herein with reference to the following drawings.

DETAILED DESCRIPTION

Humans can easily view a video sequence and identify the more notable, interesting, or important portions of the video sequence. The term "salient feature" may refer to the more notable, interesting, or important features in the video sequence. Video frames with salient features may include more action or more movement than the preceding frames and/or subsequent frames. Examples of salient features include a player kicking a ball, a car crashing into a wall, or fireworks exploding in air.

Identifying the portion of a video that includes kicking a ball, crashing a car, or exploding fireworks is easy for the human observer. However, automating this identification is difficult. Without human intervention, salient features are not easily identified. The following embodiments include hardware and software specialized to identify the video frame or frames containing salient features (e.g., the most dramatic moment). The salient features may be defined to apply to all types of actions irrespective of the specific type of actions. In other words, the salient features are the moment or moments in a video sequence that observers usually consider the most important and visually interesting form a motion perspective.

One or more of the following examples detect such salient features by tracking the motion of pixels in frames of the video sequence and by detecting inversions of direction and velocity intensity changes of moving objects. When an object or subject undergoes an abrupt change of direction or the velocity of the object or subject increases or decreases significantly, the corresponding frames of the video sequence are identified. In one example, individual frames are identified and/or extracted at a mobile camera viewfinder in real time. In another example, a stored video is analyzed to identify and/or extract frames potentially including salient features.

Figure 1:
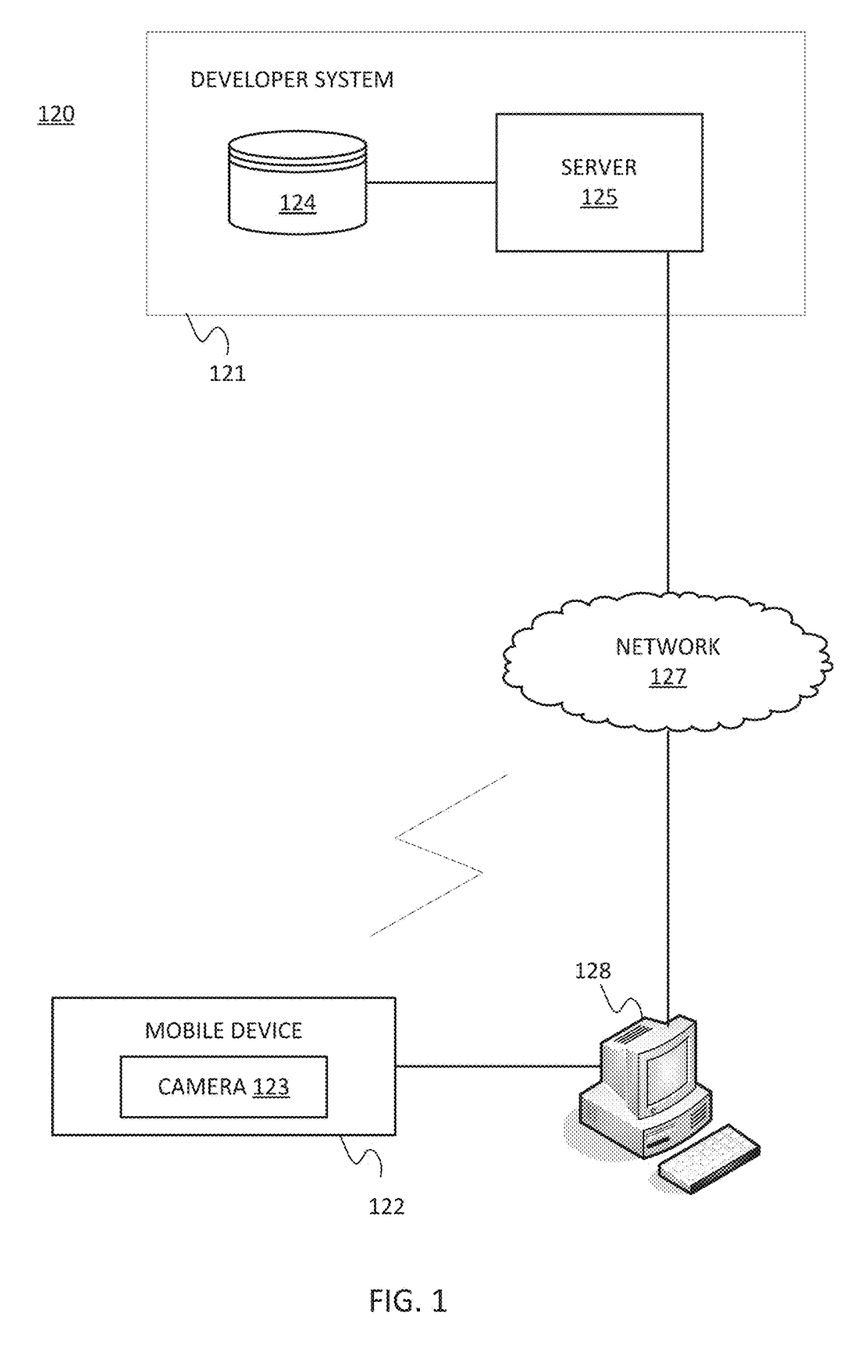
FIG. 1 illustrates an example system for detection of motion activity saliency.

FIG. 1 illustrates an example system 120 for detection of motion activity saliency. The system 120 may include a developer system 121, a mobile device 122 including a camera 123, a workstation 128, and a network 127. Additional, different, or fewer components may be provided. For example, many mobile devices 122 and/or workstations 128 connect with the network 127. The developer system 121 includes a server 125 and a database 124. The developer system 121 may include computer systems and networks of a system operator (e.g., a cellular provider, a web service operator). Addition, different, or fewer components may be included in system 120.

The camera 123 collects a series of images or a video. The video may be stored at the database 124 or internally at the mobile device 122. The video may be analyzed by a processor at the mobile device 122, the workstation 128, or server 125. The processor may generate a motion vector field including motion vectors for pixels in the video. The motion vectors may describe the movement of a pixel from one frame to the next or to a subsequent frame. The motion vectors may be calculated using an optical flow algorithm, or an approximate but dense motion estimation algorithm. The optical flow algorithm may analyze the series of images to identify the movement of edges, surfaces, or objects in the video. The motion vectors describe the movement of the edges, surfaces, or objects in the video. Each motion vector may describe a translation of a pixel from one position in one frame to a second position in the next or a subsequent frame. The motion vectors for multiple pixels in a frame may be referred to as motion vector field.

The processor may partition the motion vectors into a grid blocks. The grid blocks may divide the video frames into equal portions or unequal portions. The number of grid blocks is selectable. Example numbers of grid blocks are 4, 9, 16, 25, 100, and 256. In one example, each grid block is 7 pixels by 13 pixels. Within each grid block, the processor may bin or organize the motion vectors into one of a set of orientation ranges. The orientation ranges may divide the motion vectors further. Each motion vector has a direction or orientation.

The orientation may be an angle measured from the positive X-axis. For example, four orientation ranges may be 1 to 90 degrees, 91 to 180 degrees, 181 to 270 degrees, and 271 to 360 degrees. The processor sorts the motion vectors into the orientation ranges. The processor calculates a motion score based on a count of motion vectors for at least one of the orientation ranges. The motion score may be stored at the database 124 or locally at the mobile device 122.

The motion score may be incorporated into the video as metadata. For example, each frame in the video may be associated or stored with a motion score. The processer may compare the motion scores and identify the highest motion score or a group of high motion scores. The frame with the highest score may be used as a thumbnail for the video. The frames with the highest score may be used as a highlight clip for the video. Frames with scores above a threshold may be used as advance points. When the video is advanced or fast forwarded, the video skips ahead to the next advance point.

The mobile device 122 is a smart phone, a mobile phone, a personal digital assistant ("PDA"), a tablet computer, a notebook computer, and/or any other known or later developed portable or mobile computing device including a camera.

The optional workstation 128 is a general purpose computer including programming specialized for analyzing the video and calculating motion scores. The workstation 128 may download the video data from the mobile device 122 and analyze the video. Alternatively, the mobile device 122 may download the video data from the mobile device 122 and send the video data to the server 125 for analysis. The workstation 128 includes at least a memory, a processor, and a communication interface.

The developer system 121, the workstation 128, and the mobile device 122 are coupled with the network 127. The phrase "coupled with" is defined to mean directly connected to or indirectly connected through one or more intermediate components. Such intermediate components may include hardware and/or software-based components.

Figure 2:
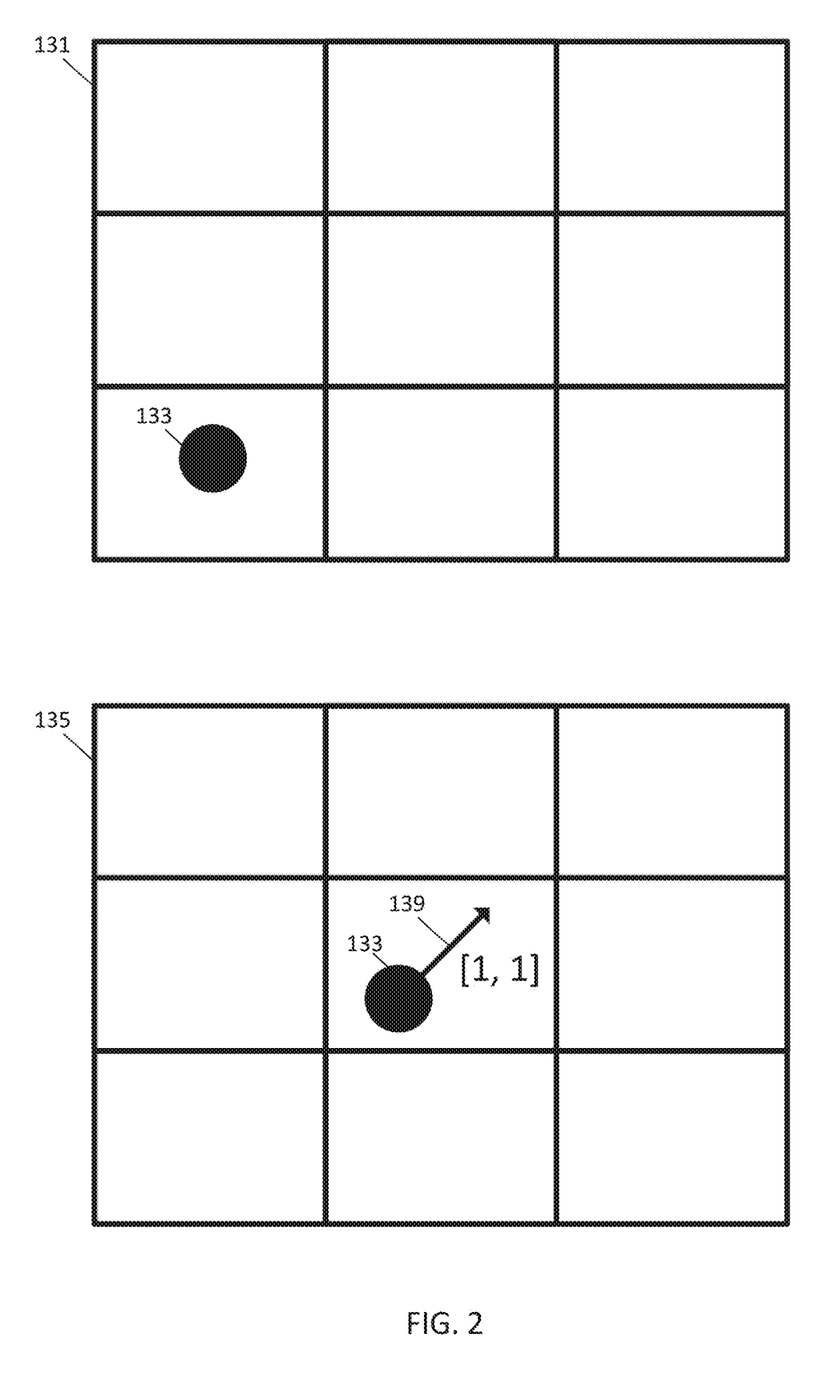
FIG. 2 illustrates an example motion vector.

FIG. 2 illustrates two consecutive video frames, including a first frame 131 and a second frame 135. The video frames may depict multiple objects that move in various directions from the first frame 131 to the second frame 135. For the purpose of illustration, FIG. 2 includes one object 133. From the first frame 131 to the second frame, the object 133 moves up and to the right (e.g., northeast). The direction of travel of the object 133 is described by vector. The motion vector may comprise two components. One component may be a horizontal distance, and one component may be a vertical distance. The motion vector may be normalized to a unit length of one.

Figure 3:
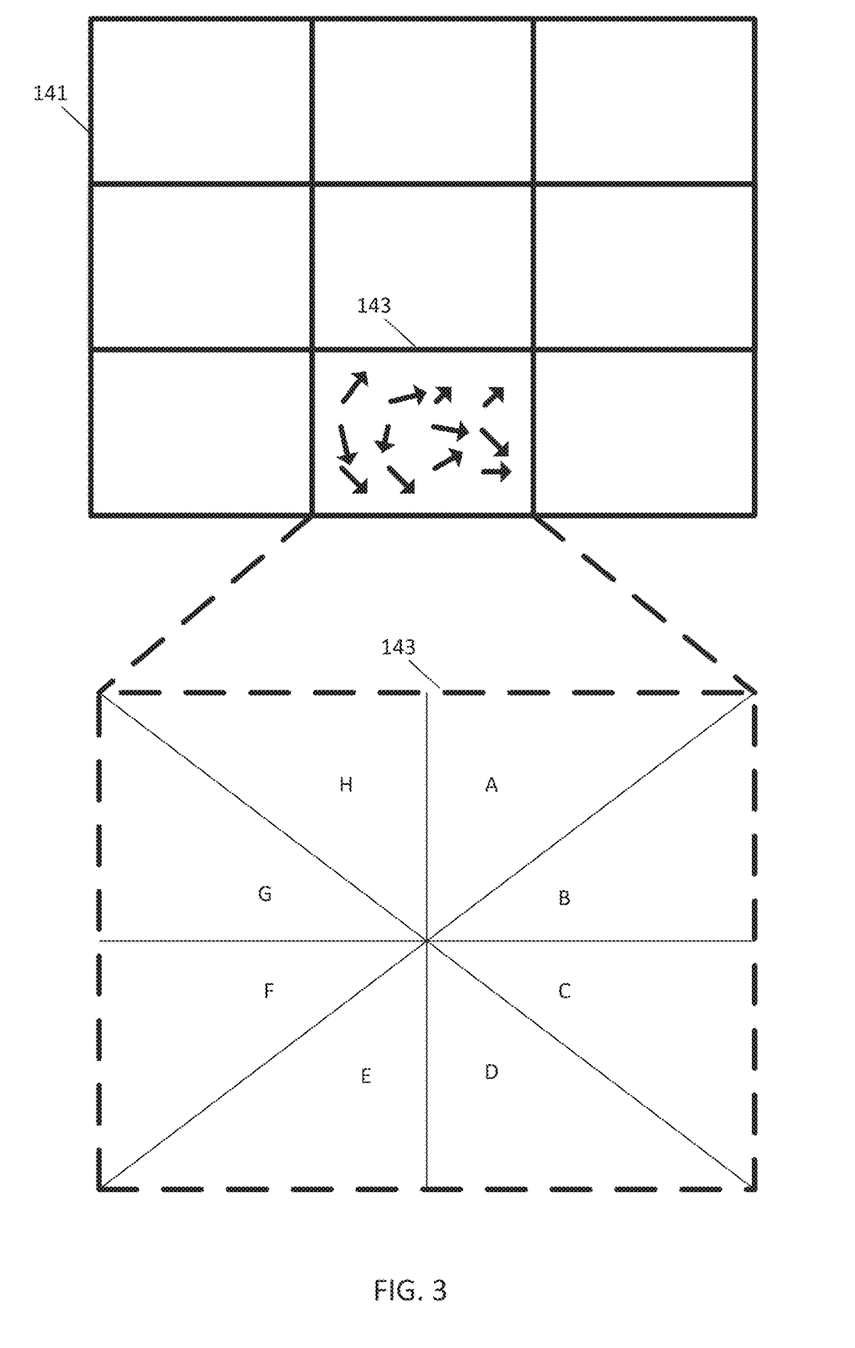
FIG. 3 illustrates an example motion vector field.

FIG. 3 illustrates an example motion vector field comprising motion vectors. The frame 141 is divided into grid blocks. Each of the grid blocks includes a moving object includes at least one motion vector. Together, the motion vectors in each of the grid blocks form a motion vector field. For the ease of illustration only grid block 143 is illustrated with a motion vector field.

The grid block 143 may be divided into orientation ranges A-H. Each of the orientation ranges is assigned an angle in degrees or radians. The angles may be measured from any point. For example, the angles may be measured from the positive vertical axis such that range A corresponds to 0 to Pi/4 radians, range B corresponds to Pi/4 radians to Pi/2 radians, range C corresponds to Pi/2 to 3Pi/4 radians, range D corresponds to 3Pi/4 to Pi radians, range E corresponds to Pi to 5Pi/4 radians, range F corresponds to 5Pi/4 to 3Pi/2 radians, range G corresponds to 3Pi/2 to 7Pi/4 radians, and range H corresponds to 7Pi/4 to 2Pi radians.

Figure 4:
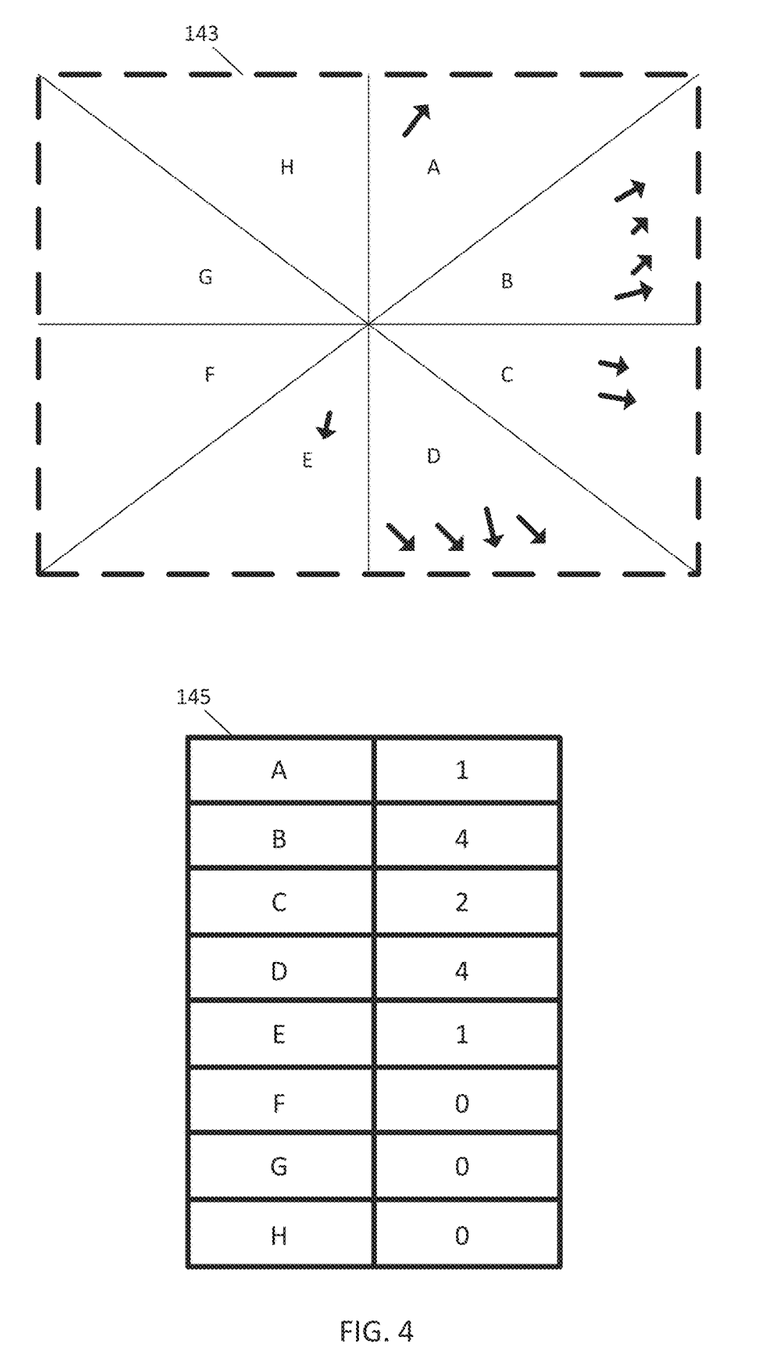
FIG. 4 illustrates example bins for a motion vector field.

FIG. 4 illustrates example bins for organizing the motion vector field. The grid block is illustrates with each of the vectors drawn in the corresponding orientation ranges. Each of the vectors points in the direction of the orientation range on which it is drawn. The example of FIG. 4 is merely illustrative. The server 125 may arrange the data representing the vectors using indexes and tables. The vectors may be organized in a histogram.

The table 145 illustrates a quantity of vectors in each of the orientation ranges. For example, orientation range A includes one vector and orientations ranges B and D each include four vectors. The table 145 may include the magnitudes of the vectors. For example, the server 125 may sum the magnitudes of the vectors in each orientation range.

In another example, the server 125 may assign count values for the vectors. Vectors with a magnitude in a small range may be assigned a count value of one, vectors with a magnitude in a medium range may be assigned a count value of two, and vectors with a magnitude in a high range may be assigned a count value of three. The ranges may be defined statistically (e.g., based on 1, 2, or 3 standard deviations from a mean of all the vectors in the frame or the video sequence) or statically (e.g., based on user input or other predetermined values).

In another example, the count values may be calculated based on the percentage of the vertical height or horizontal height of the frame. For example, a small count value may be assigned to vectors from 0% to 25% of the vertical height, a medium count value may be assigned to vectors from 26% to 75% of the vertical height, and a high count value may be assigned to vectors from 76% to 100% of the vertical height. The server 125 may include a table that associates vectors lengths to count values.

Figure 5:
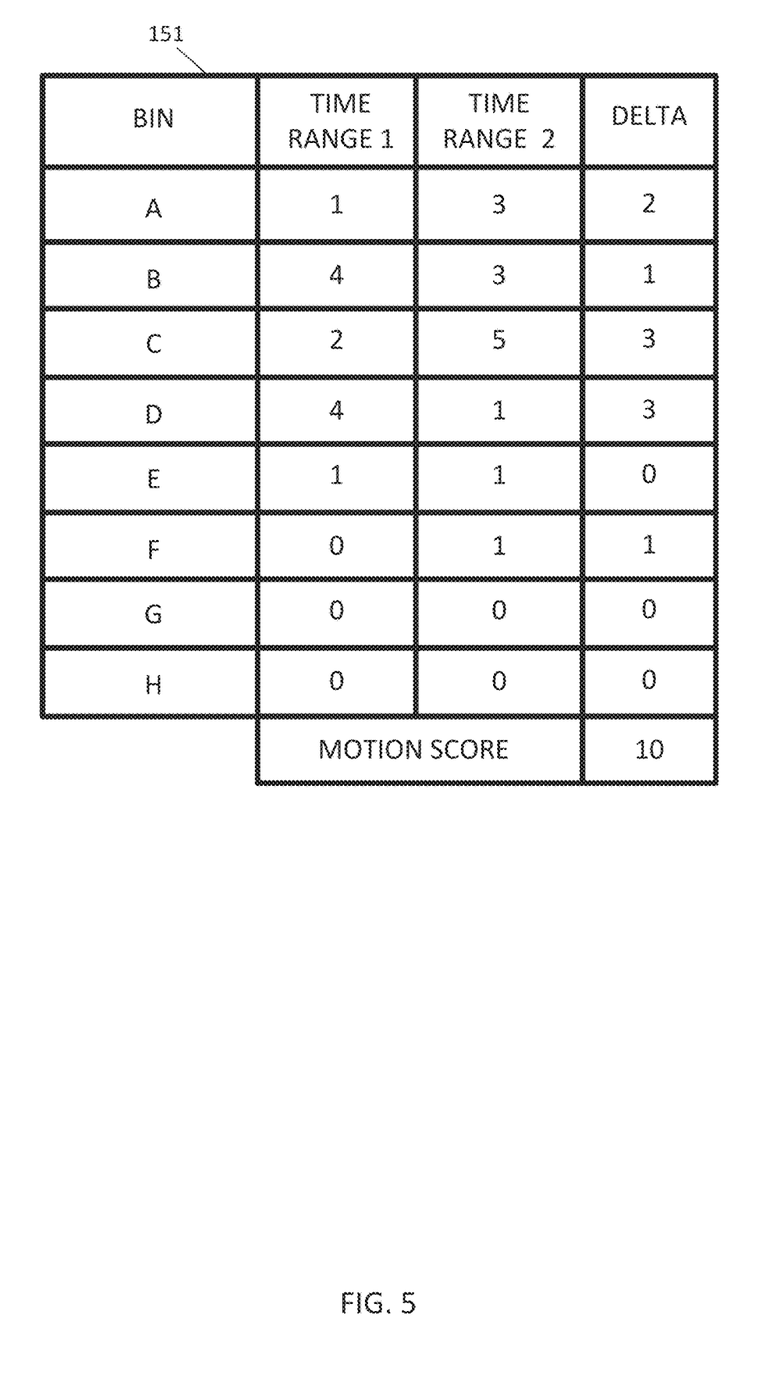
FIG. 5 illustrates an example calculation of a motion score.

FIG. 5 illustrates an example calculation of a motion score in table 145. The server 125 may calculate the count values for multiple frames or frames of multiple time ranges. The time ranges may be a predetermined number of frames (e.g., 5 frames, 10 frames or another quantity) or a predetermined duration of time (e.g., 1 second, 2 seconds, or another duration). The server 125 calculates the total count values for each of the bins or orientation ranges.

The server 125 compares the total count values for each of the bins or orientation values. For example, the server 125 subtracts the total count value for one time period from the total count value for another time period. The absolute value of the difference is shown by the delta column in table 145. The server 125 sums all of the delta values to determine the motion score when moving from time range 1 to time range 2. The next motion score, moving from time range 2 to time range 3, is calculated based on the total count values for time range 2 and time range 3. For each pair of subsequent time ranges, or subsequent video frames, another motion score is calculated.

The server 125 may sum all of the delta values to determine the motion score across all of the grid blocks when moving from time range 1 to time range 2. Center grid blocks may be weighted higher than border grid blocks. For example, a moderate level of motion in a center grid block may receive a higher motion score than a high level of motion in an off-center grid block or grid block near the edge of the frame. The server 125 may determine a grid block weight that is inversely proportional to a distance from the center of the frame. The motion score for each grid block may be multiplied by the grid block weight. For example, the center 25% of the grid blocks may be assigned a weight of 2, which doubles the associated motion scores, the middle 50% of the grid blocks may be assigned a weight of 1, which does not alter the associated motion scores, and the outer 25% of grid blocks may be assigned a weight of %, which reduces in half the associated motion scores. In one example, only the center grid blocks are used for calculating the motion score.

Figure 6:
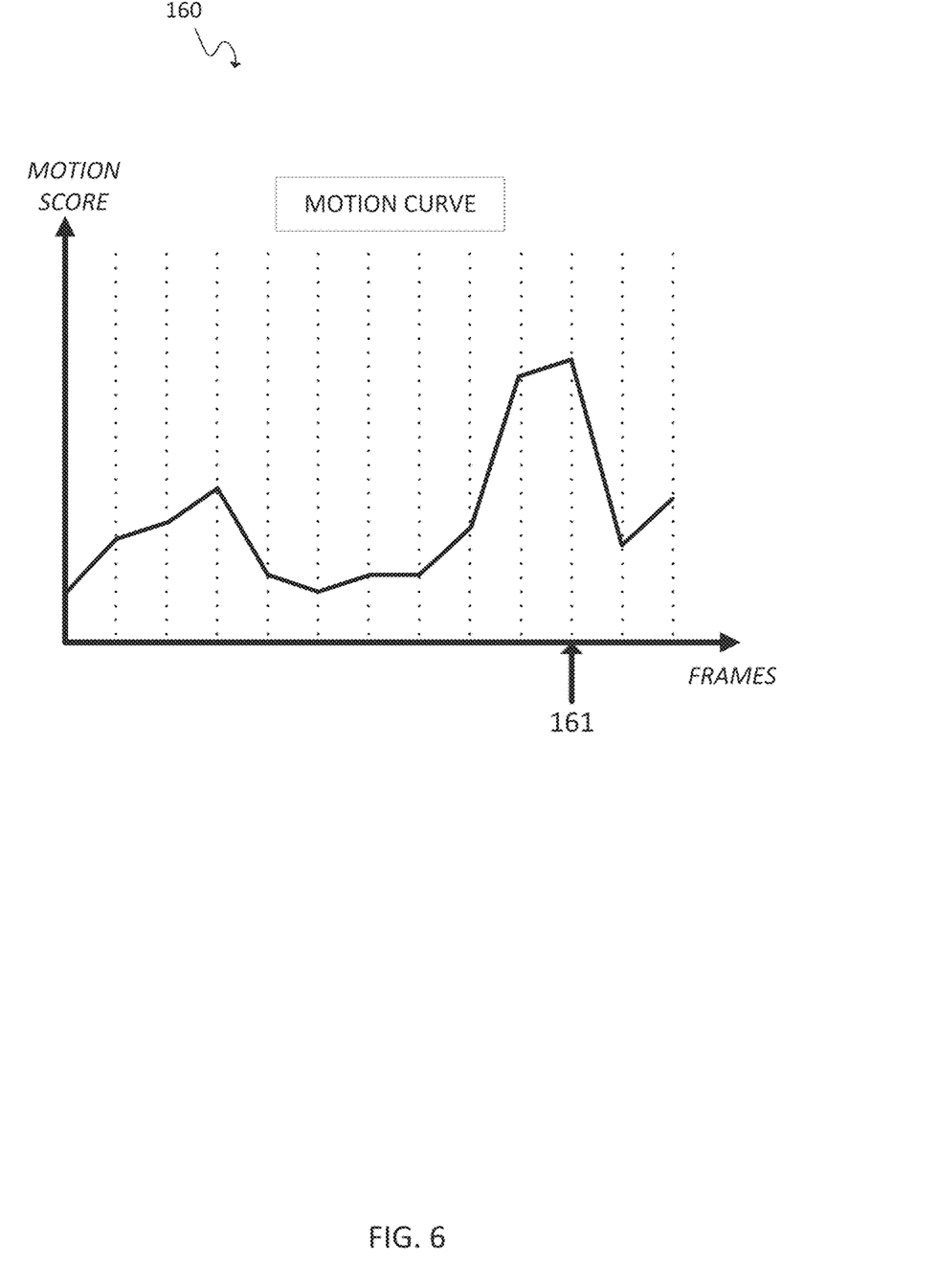
FIG. 6 illustrates an example plot of a motion curve.

FIG. 6 illustrates an example plot of a motion curve 160 drawn based on multiple motion scores in a series of video frames or a series of time periods. Higher motions scores correspond to more movement in the video, and lower motion scores correspond to less movement in the video. The server 125 may identify a frame, time period, or portion of the video sequence based on the motion scores. The server 125 may identify the highest motion score from the motion curve 160. The motion curve shown in FIG. 6 includes a maximum motion score 161. Alternatively, the server 125 may identify a predetermined number (e.g., 5, 10, or another number) of top motion scores or all of the motion scores that exceed a threshold. An identification flag may be set for the frames that correspond to the top motion scores. The identification flags may be stored with the video as metadata.

In one example, the video frames that correspond to the selected scores are used as a thumbnail. The thumbnail may be displayed on the mobile device 122 to represent the video sequence. The thumbnail may be displayed on a computer or a website when the video sequence is uploaded. In another example, the video frames that correspond to the selected scores are used as a highlight video. The set of frames that corresponds to the high motion score is played as a representation of the full video. The highlight video may be played when hovering over the thumbnail of the video sequence.

In another example, the video frames that correspond to the selected scores are stored and the remaining video is discarded. For example, a security video may record continuously. The video files may grow to be very large. The server 125 may analyze the motion score of sections of the security video and discard sections with low motion scores. The sections with low motion scores may include no activity. The sections that are retained require less storage space. Similar video editing may be done with videos of wildlife or natural phenomenon.

Figure 7:
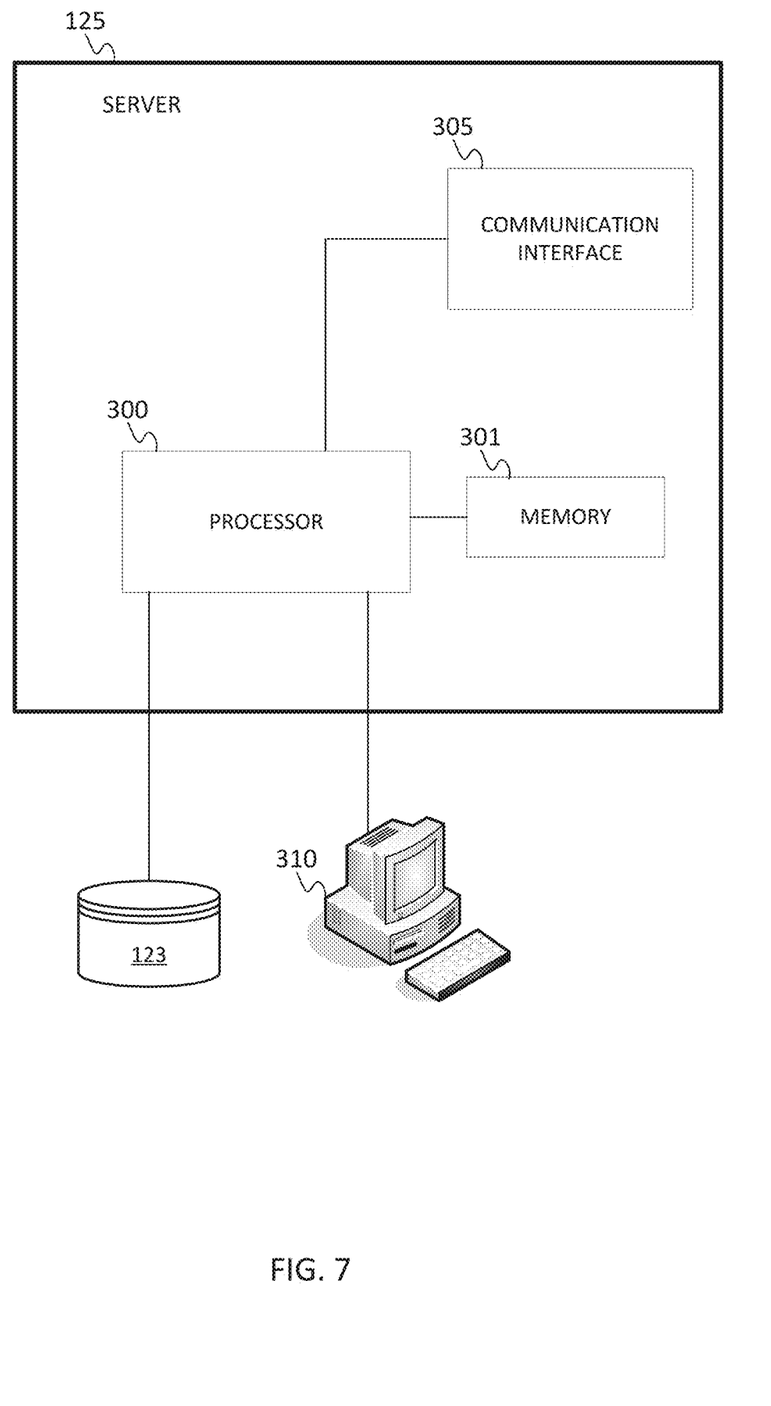
FIG. 7 illustrates an exemplary server of the system of FIG. 1.

FIG. 7 illustrates an exemplary server of the system of FIG. 1. The server 125 includes a processor 300, a communication interface 305, and a memory 301. The server 125 may be coupled to a database 124 and a workstation 310. The workstation 310 may be used as an input device for the server 125. In addition, the communication interface 305 is an input device for the server 125. The communication interface 305 receives data indicative of use inputs made via the workstation 310 or the mobile device 122.

The processor 300, which may be any type of controller, processes video images by calculating motion vectors for time ranges in the video. The processor 300 may be configured to reduce the resolution of the video or otherwise downsampled. The downsampling may occur in real time, in a frame by frame basis, or over a time period. In one example, the images may be converted to a low fixed resolution. Example low resolutions include 512 pixels by 256 pixels or 256 pixels by 128 pixels.

The motion vectors may be computed from the downsampled images. The motion vectors describe the movement of objects in the images. The motion vectors may describe the movement of one or more pixel attributes from one pixel location to another pixel location. The time ranges may be groups of frames or predetermined time durations. The processor 300 is configured to sort the motion vectors based on direction. The direction of the motion vector may be calculated as the arctangent of a first component of the motion vector divided by a second component of the motion vector. The processor 300 may sort the motion vectors into multiple orientation ranges.

The processor 300 may perform a comparison of the motion vectors in pairs of subsequent time ranges or pairs of subsequent frames. A motion score is calculated for the comparison of each pair of subsequent time ranges or each pair of subsequent frames. The processor 300 may identify the screenshot with the highest motion score in the video, the section of video with the highest average score, or discard frames that do not meet a threshold store.

To identify the screenshot or frame with the most activity, the processor 300 compares the motion score for each of the subsequent time ranges to select a highest motion score. This frame or screenshot may be used as a thumbnail to represent the video. The processor 300 may extract this frame from the video. The processor 300 may assign a flag to the video that indicates this frame is the representative frame.

To identify the portion of the video with the most activity, the processor 300 may calculate an average motion score for time intervals of the video. Alternatively, the processor 300 may calculate a running average of motion score. For example, an average of the previous ten motion scores may be calculated at each time range. The average motion scores are compared to identify the section of video with the most activity, which may be referred to as the highlight time range. The processor 300 may generate and store a flag with frames of the highlight time range.

In another example, the processor 300 may compare the motion score for each of the subsequent time ranges to a threshold motion score. The threshold motion score may be set low to distinguish frames in which no activity is occurring. The threshold motion score may be set high to distinguish the most active frames. The processor 300 may store a flag with one or more frames of the video associated with motion scores that exceed the threshold motion score. The processor 300 may delete one or more frames of the video associated with motion scores below the threshold motion score.

In any of these examples, the flags defined by the processor 300 may be used as advance points. Advance points are bookmarks in the video that define a stopping point for advancing the video. For example, when the video is playing, the playback application may include an advance command. When the advance command is activated, the playback application advances to the next advance point. Accordingly, a user can skip ahead to the next portion of the video that includes significant video.

Figure 8:
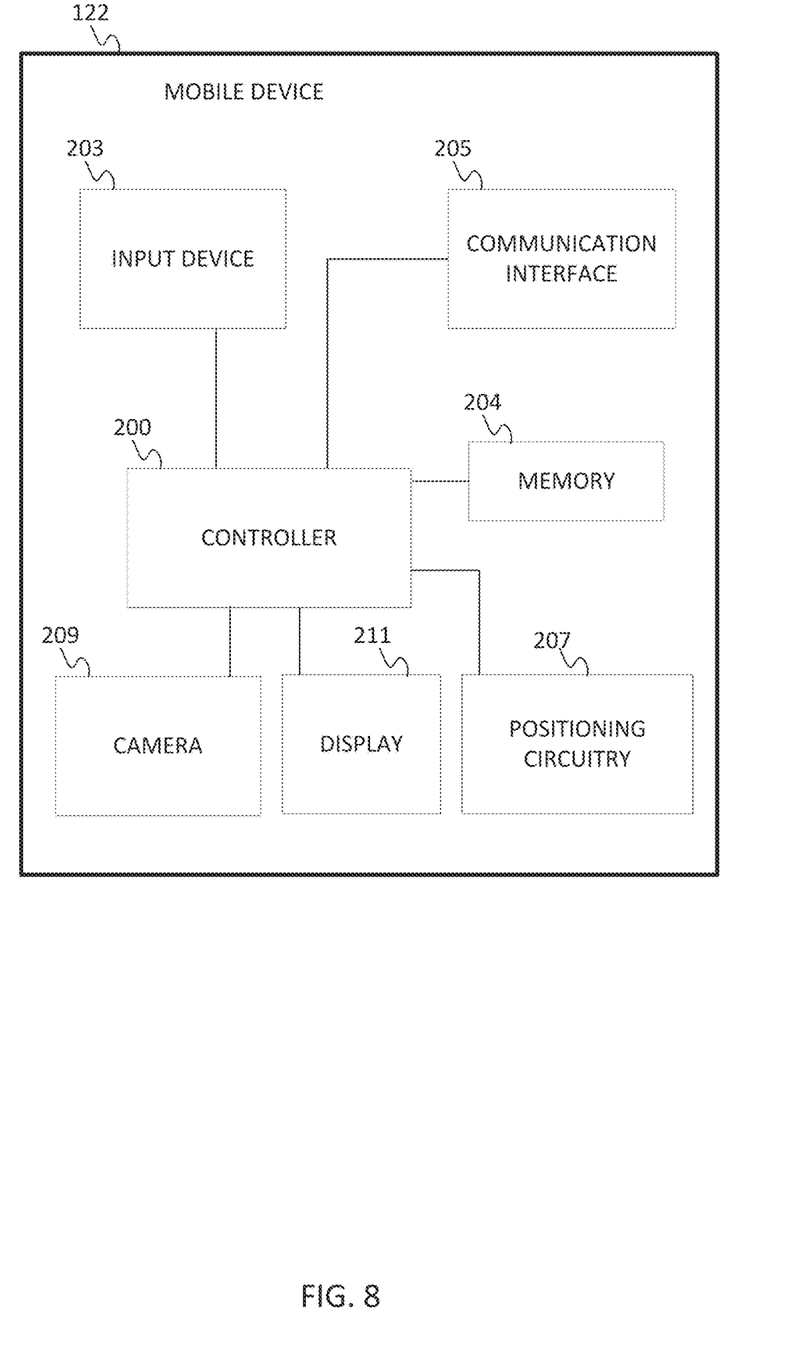
FIG. 8 illustrates an exemplary mobile device of the system of FIG. 1.

FIG. 8 illustrates an exemplary mobile device of the system of FIG. 1. The mobile device 122 includes a controller 200, a memory 204, an input device 203, a communication interface 205, a camera 209, and a display 211. FIG.

Figure 9:
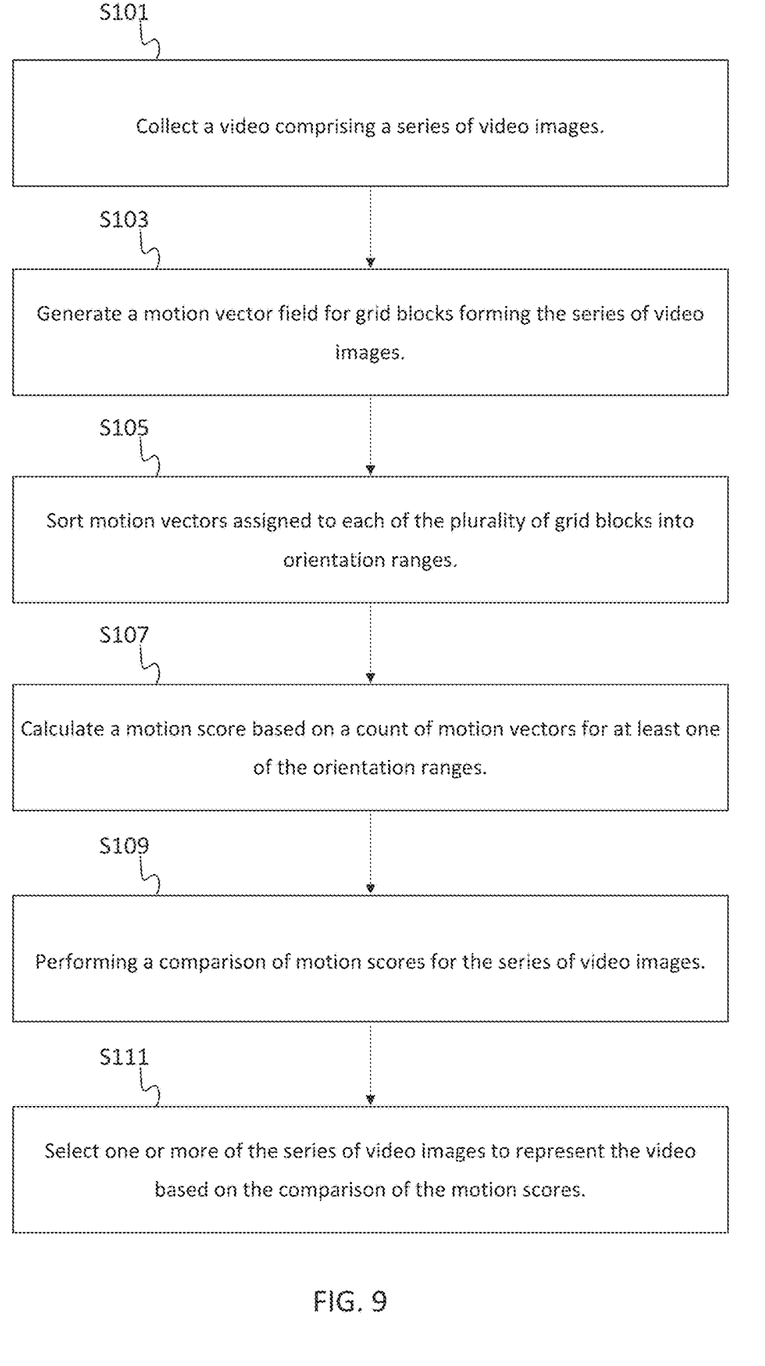
FIG. 9 illustrates another example flowchart for detection of motion activity saliency.

9 illustrates an example flowchart for identifying salient features in a video, which is described in relation to the mobile device 122 but may be performed by another device. Additional, different, or fewer acts may be provided.

At act S101, the camera 209 collects a video comprising a series of video images. Example video formats include .wav, .mp3, .mp4, .wma, 3gPP multimedia file, or other formats. The controller 200 may process the video in real time as the video is collected or after the video has been stored.

At act S103, the controller 200 generates a motion vector field for grid blocks forming the series of video images. The grid blocks subdivide the video images in any shape or size. In one example, only the middle portion (e.g., middle 50% or middle 80%) of the images are assigned grid blocks. In another example, the entire images are divided into grid blocks.

At act S105, the controller 200 sorts motion vectors assigned to each of the plurality of grid blocks into orientation ranges. The orientation ranges divide the motion vectors based on the direction of movement. At act S107, the controller 200 calculates a motion score based on a count of motion vectors for at least one of the orientation ranges. The count may represent the quantity of motion vectors that point in a particular direction. The count may be increased or decreased based on the magnitude of the motion vectors counted. The motion score describes how much activity is moving in a particular direction.

At act S109, the controller 200 performs a comparison of motion scores for the series of video images. At act S111, the controller 200 selects one or more of the series of video images to represent the video based on the comparison of the motion scores. The controller 200 may select the lowest motion score as a still shot to represent the video. The controller 200 may select the highest motion score as an action shot, which may be the most interesting portion of the video.

Alternatively, the processor 300 of the server 125 performs one or more of acts S103, S105, S107, S109, and S111. The display 211 may display the selection portion of the video. The input device 203 is configured to receive a selection for defining the selection of the representative frame. The input may define whether a frame with the highest motion score (e.g., thumbnail) should be selected, a group of frames with the highest running average of motions scores (e.g., highlight clip) should be selected, or whether video editing should be performed (e.g., discarding frame) based on the motion score comparison.

The input device 203 may be one or more buttons, keypad, keyboard, mouse, stylist pen, trackball, rocker switch, touch pad, voice recognition circuit, or other device or component for inputting data to the mobile device 122. The input device 203 and the display 211 may be combined as a touch screen, which may be capacitive or resistive. The display 211 may be a liquid crystal display (LCD) panel, light emitting diode (LED) screen, thin film transistor screen, or another type of display.

Positioning circuitry 207 is optional and may be excluded. Location data from the positioning circuitry 207 may be added to the video as metadata. The positioning circuitry 207 may include a Global Positioning System (GPS), Global Navigation Satellite System (GLONASS), or a cellular or similar position sensor for providing location data. The positioning system may utilize GPS-type technology, a dead reckoning-type system, cellular location, or combinations of these or other systems. The positioning circuitry 207 may include suitable sensing devices that measure the traveling distance, speed, direction, and so on, of the mobile device 122. The positioning system may also include a receiver and correlation chip to obtain a GPS signal. Alternatively or additionally, the one or more detectors or sensors may include an accelerometer built or embedded into or within the interior of the mobile device 122. The accelerometer is operable to detect, recognize, or measure the rate of change of translational and/or rotational movement of the mobile device 122. The mobile device 122 receives location data from the positioning system. The location data indicates the location of the mobile device 122.

The controller 200 and/or processor 300 may include a general processor, digital signal processor, an application specific integrated circuit (ASIC), field programmable gate array (FPGA), analog circuit, digital circuit, combinations thereof, or other now known or later developed processor. The controller 200 and/or processor 300 may be a single device or combinations of devices, such as associated with a network, distributed processing, or cloud computing.

The memory 201 and/or memory 301 may be a volatile memory or a non-volatile memory. The memory 201 and/or memory 301 may include one or more of a read only memory (ROM), random access memory (RAM), a flash memory, an electronic erasable program read only memory (EEPROM), or other type of memory. The memory 201 and/or memory 301 may be removable from the mobile device 100, such as a secure digital (SD) memory card.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

The network 127 may include wired networks, wireless networks, or combinations thereof. The wireless network may be a cellular telephone network, an 802.11, 802.16, 802.20, or WiMax network. Further, the network 127 may be a public network, such as the Internet, a private network, such as an intranet, or combinations thereof, and may utilize a variety of networking protocols now available or later developed including, but not limited to TCP/IP based networking protocols.

While the non-transitory computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A method comprising:
   generating, using a processor, a motion vector field including a motion vector for each of a plurality of pixels in a video;
   partitioning the motion vector field into a plurality of grid blocks;
   binning motion vectors assigned to each of the plurality of grid blocks into a plurality of orientation ranges;
   calculating a grid block weight for each of the plurality of grid blocks based on a distance to a center of the video;
   calculating, using the processor, a plurality of motion scores, wherein each of the plurality of motion scores is for a different frame of the video and is based on the grid block weight based on the distance to the center of the video and a count of motion vectors for at least one of the orientation ranges;
   identifying a frame having the highest motion score for the video, the identifying based on comparing the motion scores for different frames of the video; and
   generating data indicative of a thumbnail image for the frame of the video having the highest motion score.

2. The method of claim 1, wherein calculating the plurality of motion scores comprises:
   comparing the count of motion vectors in a first set of video frames over a first time range to a corresponding count of motion vectors in a second set of video frames over a second time range.

3. The method of claim 1, wherein calculating the motion score comprises:
   calculating a first difference between a first orientation range for a first frame and the first orientation range for a second frame;

calculating a second difference between a second orientation range for the first frame and the second orientation for the second frame; and summing at least the first difference and the second difference as the motion score.

4. The method of claim 1, further comprising:
generating metadata to designate a frame having the highest motion score.

5. The method of claim 1, further comprising:
displaying the thumbnail image for the video.

6. The method of claim 1, further comprising:
comparing the motion scores for the frames of the video to a threshold motion score;
selecting one or more frames with motion scores that exceed the threshold motion score; and
discarding one or more frames with motion scores that are less than the threshold motion score.

7. The method of claim 1, further comprising:
receiving the video at a first resolution; and
downsampling the video to a second resolution prior to generating the motion vector field.

8. An apparatus comprising:
at least one processor; and
at least one memory including computer program code for one or more programs; the at least one memory and the computer program code configured to, with the at least one processor, cause the apparatus to at least perform:
calculating motion vector fields for time ranges of frames in a video, wherein each of the motion vector fields includes motion vectors that describe movement of pixels in the video;
partitioning the motion vectors into a plurality of grid blocks;
sorting the motion vectors within each of the plurality of grid blocks into a plurality of orientation ranges;
calculating a grid block weight for each of the plurality of grid blocks based on a distance to a center of the video;
applying the grid block weight to motion vectors as weighted motion vectors;
comparing the weighted motion vectors in pairs of subsequent time ranges to calculate a motion score for each pair of subsequent time ranges;
comparing the motion scores for each of the subsequent time ranges to select a frame having the highest motion score for the video; and
generating data indicative of a thumbnail image to represent the video, the data indicative of a thumbnail image generated using the frame having the highest motion score for the video.

9. The apparatus of claim 8, wherein the at least one memory and the computer program code are configured to, with the at least one processor, cause the apparatus to at least perform:
storing a flag with one or more frames of the video, wherein the flag is indicative of the highest motion score.

10. The apparatus of claim 9, wherein the flag is accessed to generate the thumbnail image to represent the video.

11. The apparatus of claim 8, wherein the at least one memory and the computer program code are configured to, with the at least one processor, cause the apparatus to at least perform:

comparing the motion score for each of the subsequent time ranges to a threshold motion score; and
storing a flag with one or more frames of the video associated with motion scores that exceed the threshold motion score.

12. The apparatus of claim 11, wherein the at least one memory and the computer program code are configured to, with the at least one processor, cause the apparatus to at least perform:
deleting at least a portion of the video associated with motion scores below the threshold motion score.

13. The apparatus of claim 11, wherein the flag defines advance points for advancing the video.

14. The apparatus of claim 8, wherein the at least one memory and the computer program code are configured to, with the at least one processor, cause the apparatus to at least perform:
comparing the motion score for each of subsequent time ranges to identify a highlight time range with a highest average motion score; and
storing a flag with frames of the highlight time range, wherein the flag is indicative of the highest average motion score.

15. The apparatus of claim 8, wherein the at least one memory and the computer program code are configured to, with the at least one processor, cause the apparatus to at least perform:
reducing a resolution of the video prior to calculating motion vector fields for the video.

16. A non-transitory computer readable medium including instructions that when executed are operable to:
collect a video comprising a series of video frames;
generate motion vectors for tracking movement in the series of video frames, wherein each of the motion vectors is associated with one of a plurality of grid blocks forming the series of video frames;
calculate a grid block weight for each of the plurality of grid blocks based on a distance to a center of the video frames;
apply the grid block weight to motion vectors as weighted motion vectors;
sort weighted motion vectors assigned to each of the plurality of grid blocks into a plurality of orientation ranges;
calculate a motion score based on a count of weighted motion vectors for at least one of the orientation ranges;
perform a comparison of motion scores for each video frame of the series of video frames, wherein the motion scores are calculated from the weighted motion vectors; and
select one or more of the video frames to represent the video as a thumbnail image or a highlight reel, the selection based on the comparison of the motion scores, the selected one or more of the video frames having the highest motion score for the video.

17. The non-transitory computer readable medium of claim 16, the instructions configured to:
display the selected one or more of the video frames to represent the video as the thumbnail image or the highlight reel.

* * * * *